UNITED STATES PATENT OFFICE.

ERNEST AUGUSTE GEORGE STREET, OF PARIS, FRANCE.

EXPLOSIVE AND METHOD OF MAKING SAME.

SPECIFICATION forming part of Letters Patent No. 625,908, dated May 30, 1899.

Application filed June 27, 1898. Serial No. 684,608. (No specimens.)

*To all whom it may concern:*

Be it known that I, ERNEST AUGUSTE GEORGE STREET, engineer, a citizen of the Republic of France, and a resident of Paris, France, have invented a new and useful Improved Manufacture of Explosives, which is fully set forth in the following specification.

In a former patent, No. 598,618, dated February 8, 1898, I claimed the solution in oil of nitro or azo derivatives, alone or mixed, in order to produce chlorate powders by mixing these solutions with chlorate of potash at a temperature at which said solutions are liquid; but there are other substances which do not come under the head of nitro derivatives—namely, nitric ethers, such as nitroglycerine, nitrocellulose, or organic salts, as picrate of aniline. Nitroglycerine and nitrocellulose are not soluble in oil, and it would be impossible to prepare sufficiently homogeneous chlorate powders containing both oil and nitroglycerine or oil and nitrocellulose without risk of accident, which would be considerable.

This invention has for its object to utilize these substances in the manufacture of chlorate powders by processes hereinafter described and is based on the following properties of nitroglycerine and nitrocellulose.

Nitroglycerine and mononitronaphthaline can be mixed in any proportion at the melting temperature of the nitronaphthaline. When the quantity of nitronaphthaline exceeds a certain proportion, it crystallizes when cooled. The solubility of nitronaphthaline in nitroglycerine is well known; but what is not known is the property of vegetable or animal oil to dissolve in these solutions in a certain proportion. Inversely a certain quantity of nitroglycerine can be dissolved in a solution of nitronaphthaline in oil. These mixtures do not explode under a blow of a hammer on an anvil. Without entering into details as to solubility of these substances with regard one to the other, the following examples may be given: To a solution of one hundred grams of nitronaphthaline in fifty grams of castor-oil at 70° to 80° centigrade can be added one hundred grams of nitroglycerine without there occurring on cooling anything except the crystallization of a small quantity of nitronaphthaline, which renders the mass pasty. Nitroglycerine and oil do not separate out. On the other hand, to dissolve one hundred grams of nitroglycerine in one hundred grams of oil it is necessary to add one hundred and fifty grams of nitronaphthaline. The temperature is raised to 70° to 80°, as before, and the mixture having once been effected does not separate on cooling, only a slight crystallization of nitronaphthaline being noticeable, as before, which renders the mass pasty. When heated to a temperature of about 70° to 80°, the solubility is much greater, and to dissolve one hundred grams of nitroglycerine in one hundred grams of oil it is only necessary to add one hundred grams of nitronaphthaline. In the same way it is possible to dissolve fifty grams of castor-oil in one hundred grams of nitroglycerine in the presence of sixty grams of nitronaphthaline. If to these mixtures is added pulverized chlorate of potash, soda, or an alkaline perchlorate, the temperature being maintained by cooling, no separation is noticeable and an absolutely homogeneous powder is obtained, the mixture having been effected while the substances were dissolved in one another. The following are, by way of example, two compositions of these powders:

First. Nitronaphthaline, five hundred grams; nitroglycerine, four hundred grams; castor-oil, one hundred grams; chlorate of potash, two thousand four hundred grams.

Second. Nitronaphthaline, one hundred and ten grams; nitroglycerine, fifty grams; castor-oil, sixty grams; chlorate of potash, seven hundred and eighty grams.

Dinitrocellulose is not soluble in vegetable or animal oils, but is soluble in nitronaphthaline, which gelatinizes it at its melting temperature as nitroglycerine. The proportion of nitrocellulose that can be gelatinized in this reagent without the aid of a solvent is comparatively small, owing to the fact that as soon as six to eight per cent. of dinitrocellulose has been introduced the mass becomes too thick, even at 80°, to allow of more being added. With the proportion hereinbefore indicated a gelatinous and plastic product is obtained when hot, which hardens when cooled.

If, say, a solution of one gram of dinitrocellulose in twenty grams of dinitronaphthaline is taken and the whole melted over a water-bath, five to seven grams of oil can be added to this solution. By stirring the products while hot the mixture is gradually effected and ends by becoming completely homogeneous. By using mechanical stirring devices and gradually adding oil a greater quantity of oil could certainly be added and a very homogeneous mass obtained. On the other hand, if it is desired to gelatinize dinitrocellulose in a solution of nitronaphthaline in oil the gelatinization commences in a mixture of thirty grams of nitronaphthaline in ten grams of oil; but it takes place very slowly. For a quicker gelatinization thirty-five grams of nitronaphthaline in ten grams of oil must be taken.

Trinitrocellulose also gelatinizes in commercial nitronaphthaline, although more slowly than dinitrocellulose, and gelatinization in mixtures of oil and nitronaphthaline takes place in the same way, although a little more slowly.

The following is an example: Nitronaphthaline, one hundred and twenty grams; castor-oil, eighty grams; dinitrocellulose, ten grams; chlorate of potash, eight hundred grams.

Nitrobenzene can be used in the same manner as nitronaphthaline for dissolving oil in nitroglycerine. As before, nitrobenzene and nitroglycerine mix in all proportions, and a mixture of equal parts of nitroglycerine and nitrobenzene does not detonate under the blow of a hammer on an anvil. As to solubility, two examples will be given in illustration. A mixture of one hundred grams of castor-oil and one hundred grams of nitrobenzene easily dissolves one hundred grams of nitroglycerine. One hundred grams of castor-oil and three hundred grams of nitrobenzene dissolve four hundred grams of nitroglycerine. These mixtures are too liquid to allow of their being mixed alone in a practical manner with chlorate of potash, the absorbing power of which is small. There would be a risk of their exuding. They can be thickened either by the addition of finely-divided cellulose in the form, for instance, of finely-pulverized paper-pulp or of a solid nitro derivative or by the addition of dinitrocellulose, which gelatinizes more easily in nitrobenzene than in nitroglycerine, gelatinization taking place when cold in the first reagent.

Oil only slightly decreases the solubility of nitrocellulose in nitrobenzene, and it is possible to dissolve one gram of pyroxylin in fifteen grams of nitrobenzene and five grams of oil previously mixed, as well as in a mixture of ten grams of nitrobenzene and ten grams of oil. These solutions of nitrocellulose constitute resins not sensitive to blows, which easily absorb chlorate of potash. The final product also has the appearance and consistency of a resin.

The following examples may be given:

First. Chlorate of potash, eight hundred grams; nitrobenzene, one hundred and fifty grams; castor-oil, fifty grams; pyroxylin, ten grams.

Second. Chlorate of potash, eight hundred grams; nitrobenzene, one hundred grams; castor-oil, one hundred grams; pyroxylin, ten grams.

Having given the properties of nitronaphthaline and nitrobenzene, which both dissolve pyroxylin, even in the presence of a certain proportion of oil, I also claim the mixture of these four substances, which, mixed with chlorate of potash, give a powder or explosive for mines possessing advantageous properties. An example of this kind of explosive is as follows: Chlorate of potash, seven hundred and twenty grams; nitronaphthaline, eighty grams; nitrobenzene, ninety grams; pyroxylin, twenty grams; castor-oil, ten grams.

Besides nitronaphthaline there are other nitro or azo derivatives which are soluble in nitroglycerine—such as binitrobenzene, azobenzol, nitraniline, &c.—and which absorb a certain proportion of oil under the conditions previously stated.

Example 1: Binitrobenzene, fifty grams; nitroglycerine, forty grams; chlorate of potash, ten grams; castor-oil, two hundred and forty grams.

Example 2: Nitraniline, forty grams; nitroglycerine, forty grams; castor-oil, twenty grams; chlorate of potash, two hundred and forty grams.

Example 3: Azobenzol, fifty grams; nitroglycerine, forty grams; castor-oil, ten grams; chlorate of potash, two hundred and forty grams.

I may also introduce into these mixtures a certain quantity of nitrated cotton. The solubility of nitrated cotton is not reduced by the presence of binitrobenzene and oil in nitroglycerine, while, on the contrary, the presence of azobenzol and nitraniline slightly reduces the tendency to gelatinization.

Example 1: Binitrobenzene, fifty grams; nitroglycerine, fifty grams; pyroxylin, ten grams; castor-oil, ten grams; chlorate of potash, two hundred and forty grams.

Example 2: Nitraniline, forty grams; nitroglycerine, sixty grams; pyroxylin, ten grams; castor-oil, ten grams; chlorate of potash, two hundred and forty grams.

Example 3: Azobenzol, fifty grams; nitroglycerine, fifty grams; pyroxylin, ten grams; castor-oil, ten grams; chlorate of potash, two hundred and forty grams.

In the mixture previously described, with nitrobenzene as a base, another nitro or azo derivative—such as binitrobenzene, binitronaphthaline, nitraniline, azobenzol, &c.—can be substituted for nitronaphthaline.

Example 1: Chlorate of potash, seven hundred and twenty grams; binitrobenzene, eighty grams; nitrobenzene, ninety grams; pyroxylin, ten grams; castor-oil, ten grams.

Example 2: Chlorate of potash, seven hundred and twenty grams; binitronaphthaline, seventy grams; nitrobenzene, one hundred grams; pyroxlyn, ten grams; castor-oil, ten grams.

Example 3: Chlorate of potash, seven hundred and twenty grams; nitraniline, seventy grams; nitrobenzene, one hundred grams; pyroxylin, ten grams; castor-oil, ten grams.

Example 4: Chlorate of potash, seven hundred and twenty grams; azobenzol, seventy grams; nitrobenzene, one hundred grams; pyroxylin, ten grams; castor-oil, ten grams.

It only remains now to mention picrate of aniline. Picrate of aniline alone does not constitute an explosive. The solubility of picrate of aniline in oil is very small, being less than ten per cent. at 90°. In nitrobenzene it is possible to dissolve at about 100° twenty per cent. of picrate of aniline. If to this solution are added ten grams of oil, the picrate of aniline is not reprecipitated at 80°. On cooling the salt freely crystallizes and the mass preserves a syrupy consistence. If chlorate of potash is added to the hot solution, crystallization takes place, so to say, molecule by molecule, on cooling, and an absolutely homogeneous powder is obtained.

The following is an example of an explosive with picrate of aniline as base: Chlorate of potash, eighty-eight grams; picrate of aniline, two grams; castor-oil, ten grams; nitrobenzene, ten grams.

It will be fully understood that although specific mention is not made in the following claims of all the substances that may be treated according to this invention the said invention embraces the production of explosive powders by use of the nitric ethers and equivalent substances (especially picrate of aniline) which are characterized by being insoluble or slightly soluble in oil, by adding to the mixture an agent contributing solubility, such as nitronaphthaline and the equivalents thereof.

I claim—

1. The process of manufacturing explosives consisting in forming, at an elevated temperature, a solution of a nitric ether an analogous combustible substance wherein the nitric ether is soluble, and an oil, derived from an organic substance, and adding thereto a chlorate powder.

2. An explosive compound consisting of chlorate powder mixed with a solution of a nitric ether, an analogous combustible substance wherein the former is soluble, and an oil derived from organic substance.

3. An explosive compound consisting of chlorate powder mixed with a solution of nitroglycerine and nitronaphthaline in an oil of organic origin.

In testimony whereof I have signed this specification in the presence of two subscribing witnesses.

ERNEST AUGUSTE GEORGE STREET.

Witnesses:
EDWARD P. MACLEAN,
ANTOINE ROUSSANNES.